(12) United States Patent
Cerri

(10) Patent No.: US 9,297,435 B2
(45) Date of Patent: Mar. 29, 2016

(54) TUNED VIBRATION ABSORBER

(71) Applicant: The Pullman Company, Milan, OH (US)

(72) Inventor: Joseph F. Cerri, Norwalk, OH (US)

(73) Assignee: The Pullman Company, Milan, OH (US)

(*) Notice: Subject to any disclaimer, the term of this patent is extended or adjusted under 35 U.S.C. 154(b) by 0 days.

(21) Appl. No.: 14/282,519

(22) Filed: May 20, 2014

(65) Prior Publication Data

US 2015/0337916 A1    Nov. 26, 2015

(51) Int. Cl.
| | | |
|---|---|---|
| *F16F 15/14* | (2006.01) | |
| *F16F 7/108* | (2006.01) | |
| *F16F 15/133* | (2006.01) | |
| *B60G 11/23* | (2006.01) | |

(52) U.S. Cl.
CPC ............... *F16F 7/108* (2013.01); *B60G 11/23* (2013.01); *F16F 15/133* (2013.01); *F16F 15/1442* (2013.01)

(58) Field of Classification Search
CPC ......... B60G 11/23; B60G 33/045; F16F 1/38; F16F 15/126; F16F 15/12; F16F 15/133; F16F 15/121; F16F 15/1442
USPC ............ 188/379, 381; 280/124.169, 124.177, 280/124.178
See application file for complete search history.

(56) References Cited

U.S. PATENT DOCUMENTS

| | | | |
|---|---|---|---|
| 2,854,100 A | 9/1958 | Bowser et al. | |
| 3,113,769 A * | 12/1963 | Pryale | 267/282 |
| 3,706,481 A * | 12/1972 | Kramer | 305/134 |
| 4,690,069 A * | 9/1987 | Willetts | 105/224.1 |
| 5,007,660 A * | 4/1991 | Orndorff et al. | 280/124.102 |
| 5,303,907 A * | 4/1994 | Holzheimer | 267/281 |
| 5,413,374 A * | 5/1995 | Pierce | 280/124.177 |
| 5,577,854 A * | 11/1996 | Jacob et al. | 403/2 |
| 5,842,677 A * | 12/1998 | Sweeney et al. | 248/635 |
| 6,145,858 A * | 11/2000 | Foulquier | 280/124.13 |
| 6,439,359 B1 | 8/2002 | Kato et al. | |
| 6,837,345 B1 * | 1/2005 | Lauble et al. | 188/378 |
| 8,523,208 B2 * | 9/2013 | Rezania et al. | 280/124.128 |
| 8,550,315 B2 | 10/2013 | Houser et al. | |
| 8,579,311 B2 | 11/2013 | Butlin, Jr. et al. | |
| 2006/0108489 A1 | 5/2006 | Hartgers et al. | |
| 2008/0203120 A1 | 8/2008 | McGuire et al. | |
| 2011/0290607 A1 | 12/2011 | Teknos et al. | |

* cited by examiner

*Primary Examiner* — Thomas Irvin
(74) *Attorney, Agent, or Firm* — Harness, Dickey & Pierce, P.L.C.

(57) ABSTRACT

A vibration absorber for a vehicle. The vibration absorber includes a bushing assembly and a mass. The bushing assembly includes an elastomeric element. The mass is mounted relative to the bushing assembly. Movement of the mass articulates the elastomeric element in shear to absorb vibration of the vehicle.

17 Claims, 4 Drawing Sheets

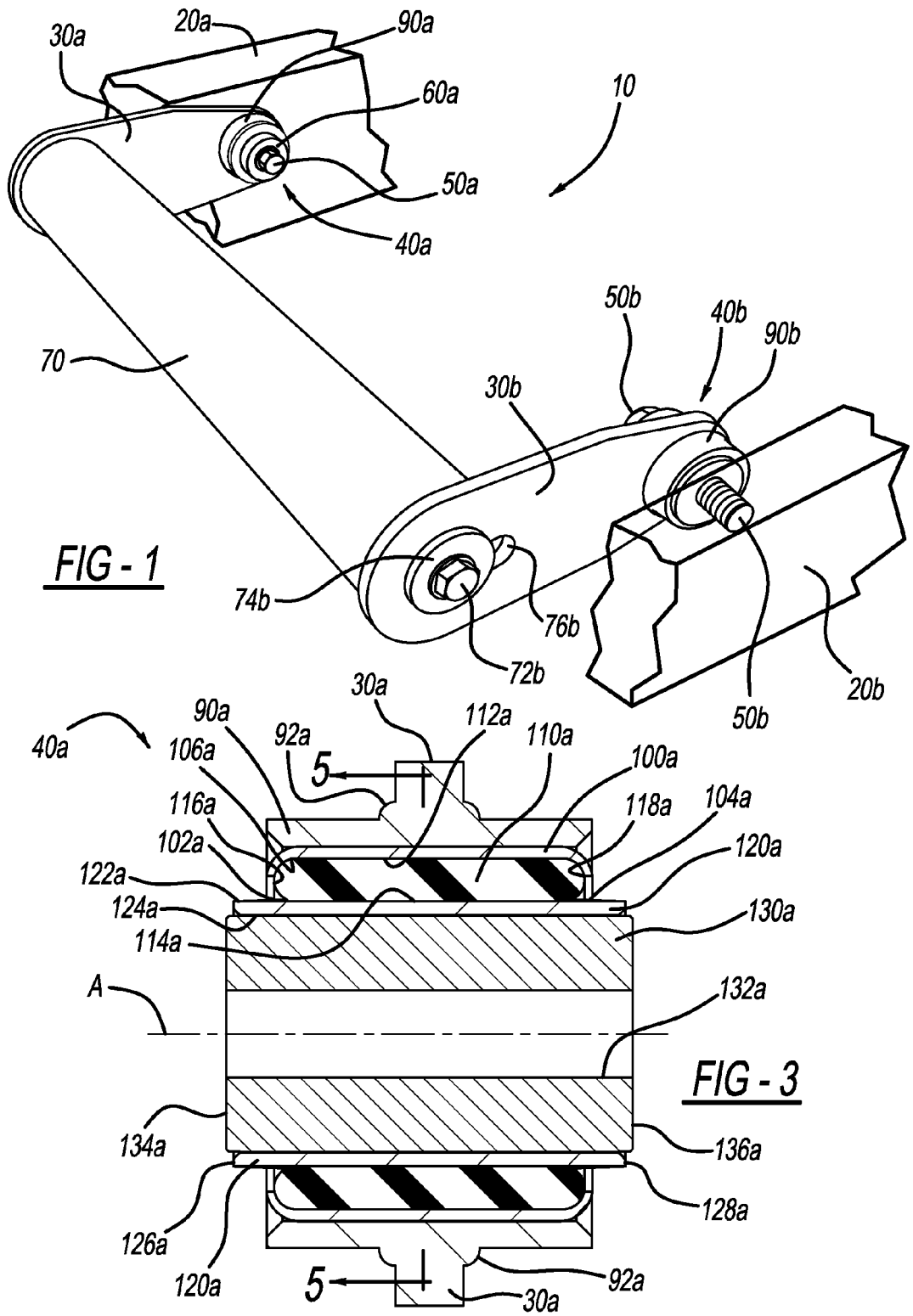

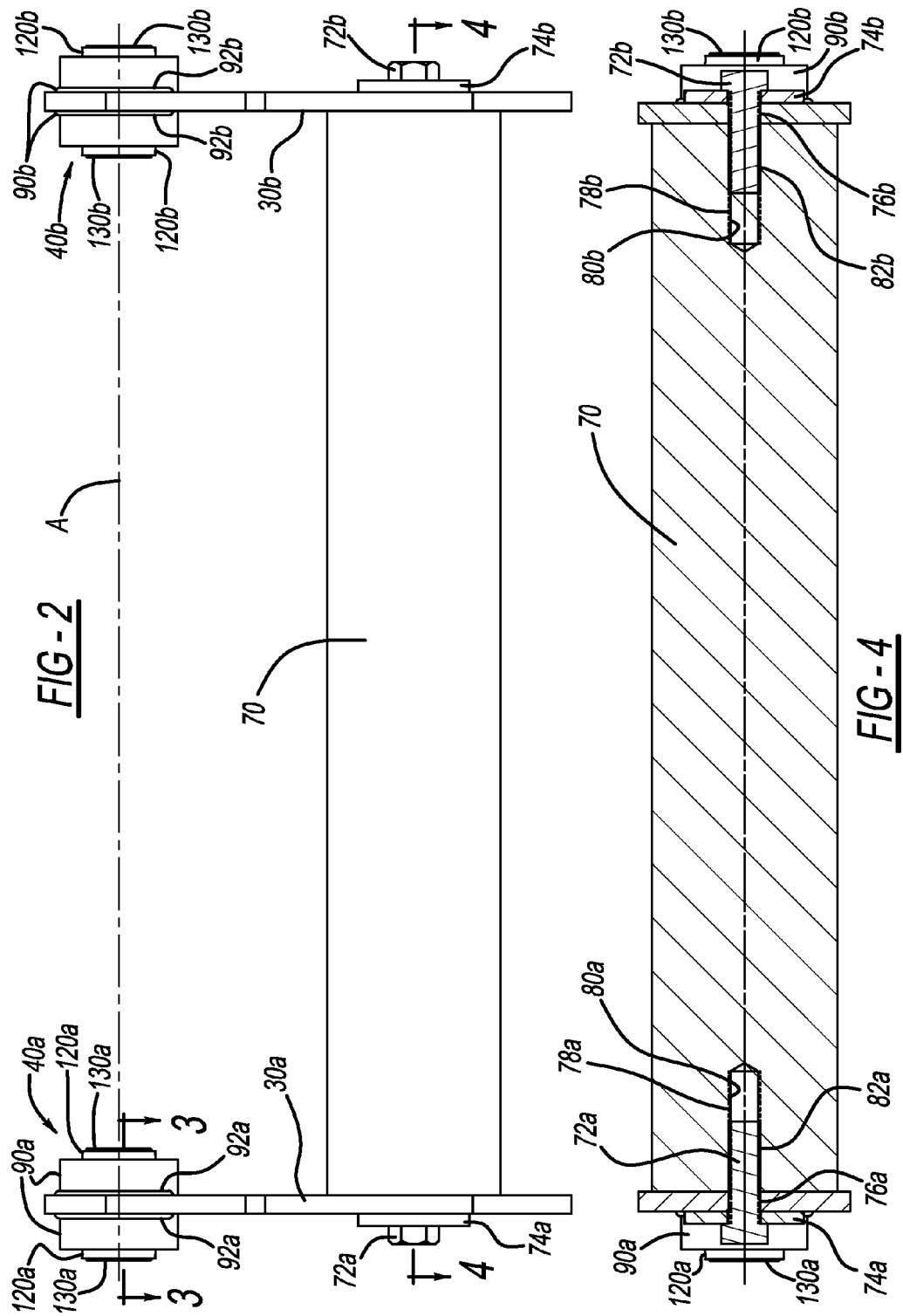

TUNED VIBRATION ABSORBER

FIELD

The present disclosure relates to a tuned vibration absorber.

BACKGROUND

This section provides background information related to the present disclosure, which is not necessarily prior art.

Vibration absorbers (also known as tuned mass dampers) are used to absorb or dampen vibrations of a mass system, such as a vehicle, during normal operation thereof. Vibration absorbers often include a single spring element supporting a mass in a manner that permits the mass to vibrate in resonance at a frequency that matches vibrations of the vehicle in order to absorb vibrations of the vehicle. While current vibration absorbers are suitable for their intended use, they are subject to improvement. For example, it may be difficult to control motion of the mass, particularly in applications where a large mass is required, such as with trucks and other large vehicles. The present teachings provide for a vibration absorber that overcomes these and other issues in the art.

SUMMARY

This section provides a general summary of the disclosure, and is not a comprehensive disclosure of its full scope or all of its features.

The present teachings provide for a vibration absorber for a vehicle. The vibration absorber includes a bushing assembly and a mass. The bushing assembly includes an elastomeric element. The mass is mounted relative to the bushing assembly. Movement of the mass articulates the elastomeric element in shear to absorb vibration of the vehicle.

The present teachings further provide for a vibration absorber for a vehicle including a support arm, a mass, a mounting member, and an elastomeric element. The support arm defines an aperture. The mass is mounted to the support arm. The mounting member is seated within the aperture of the support arm and is configured to be mounted to the vehicle. The elastomeric element is between the mounting member and the support arm. Movement of the mass articulates the elastomeric element in shear to absorb vibration of the vehicle.

The present teachings also provide for a vibration absorber for a vehicle including a first support arm, a second support arm, a mass, and an elastomeric element. The first support arm includes a first bushing assembly configured to be mounted to the vehicle. The second support arm includes a second bushing assembly configured to be mounted to the vehicle. The first and the second support arms extend generally parallel to one another. The mass is mounted to and extends between the first and the second support arms. The elastomeric element is included with each one of the first and the second bushing assemblies. Movement of the mass articulates the elastomeric element of each of the first and the second bushing assemblies in shear to absorb vibration of the vehicle.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 1 is a perspective view of a vibration absorber according to the present teachings mounted between first and second frame members of a vehicle;

FIG. 2 is a plan view of the vibration absorber of FIG. 1;

FIG. 3 is a cross-sectional view taken along line 3-3 of FIG. 2;

FIG. 4 is a cross-sectional view taken along line 4-4 of FIG. 2;

Corresponding reference numerals indicate corresponding parts throughout the several views of the drawings.

DETAILED DESCRIPTION

Figure 5:
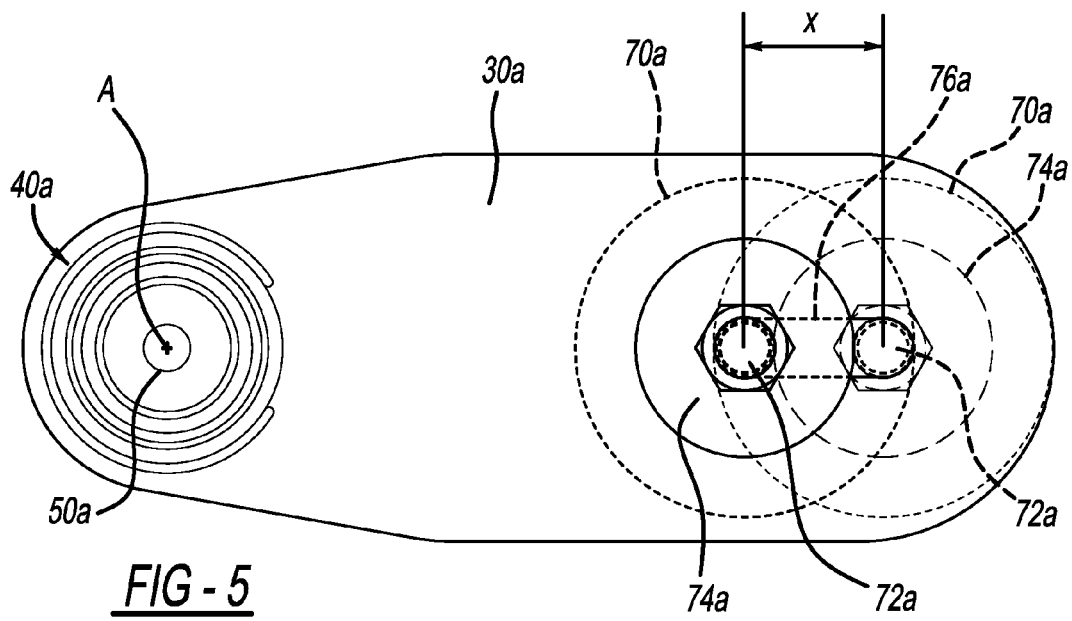
FIG. 5 is a side view of the vibration absorber of FIG. 1 illustrating a range of exemplary positions of a mass of the vibration absorber.

Example embodiments will now be described more fully with reference to the accompanying drawings.

With initial reference to FIG. 1, a vibration absorber according to the present teachings is generally illustrated at reference numeral 10. The vibration absorber 10 can be coupled to a mass system in order to absorb (dampen) vibrations thereof. The vibration absorber 10 can be coupled to any suitable mass system, such as a truck, mass transit vehicle, military vehicle, or building, for example.

As illustrated, the vibration absorber 10 is coupled between a first vehicle member 20a and a second vehicle member 20b. The first and second vehicle members 20a and 20b can be any suitable portions of a vehicle, such as frame portions of the vehicle. Thus the first vehicle member 20a can be a first frame member or frame rail, and the second vehicle member 20b can be a second frame member or frame rail. The first and second vehicle members 20a and 20b can extend in parallel, such as when the first and second vehicle members 20a and 20b are first and second frame rails.

The vibration absorber 10 includes a first support arm 30a and a second support arm 30b. The first and second support arms 30a and 30b extend lengthwise generally parallel to one another. At a first end of each of the first and second support arms 30a and 30b is a first bushing assembly 40a and a second bushing assembly 40b respectively. The first bushing assembly 40a is configured to receive a first mounting bolt 50a for securing the first support arm 30a to the first vehicle member 20a. The second bushing assembly 40b is configured to receive a second mounting bolt 50b for securing the second support arm 30b to the second vehicle member 20b.

Between a head of the first mounting bolt 50a and the first bushing assembly 40a is a first washer 60a. A second washer (not shown) is similarly positioned between a head of the second mounting bolt 50b and the second bushing assembly 40b. As explained in greater detail herein, the first washer 60a and the second washer help maintain respective cooperation between the first support arm 30a and the first vehicle member 20a, and between the second support arm 30b and the second vehicle member 20b.

The vibration absorber 10 further includes a mass 70. The mass 70 extends between, and is coupled at opposite ends to, the first support arm 30a and the second support arm 30b. For example and with additional reference to FIGS. 2 and 4, the mass 70 is coupled to the first support arm 30a with a first mass bolt 72a, and is coupled to the second support arm 30b with a second mass bolt 72b. Between a head of the first mass bolt 72a and an outer surface of the first support arm 30a is a first mass washer 74a. Likewise, between a head of the second mass bolt 72b and an outer surface of the second support arm 30b is a second mass washer 74b.

The first and second mass bolts 72a and 72b are sized and shaped to be received within first and second bores 78a and 78b defined within opposite ends of the mass 70. Defined within the first and second bores 78a and 78b are threads 80a and 80b respectively. The threads 80a and 80b are configured to cooperate with mass bolt threads 82a and 82b in order to secure the first mass bolt 72a within the first bore 78a, and to secure the second mass bolt 72b within the second bore 78b.

The first and second support arms 30a and 30b can respectively define first and second slots 76a and 76b. The first and second mass bolts 72a and 72b can be positioned to extend through the first and second slots 76a and 76b respectively. The first and second slots 76a and 76b generally extend along lengths of the first and second support arms 30a and 30b respectively, thereby allowing the mass to be positioned at any suitable position along the lengths of the first and second support arms 30a and 30b, such as closer to or further away from the first and second bushing assemblies 40a and 40b, which as described further herein provide pivot points for the vibration absorber 10.

The mass 70 can be coupled to the first and second support arms 30a and 30b in any suitable manner, such as to permit positioning of the mass 70 at one or more positions along the lengths of the first and second support arms 30a and 30b in order to vary the distance that the mass 70 is mounted from the pivot points of the vibration absorber 10 at the first and second bushing assemblies 40a and 40b. By positioning the mass 70 at a specific distance from the first and second bushing assemblies 40a and 40b, the vibration absorber 10 can be tuned to dampen vibrations of a particular frequency or frequency range. For example, in place of or in addition to the first and second slots 76a and 76b, the first and second support arms 30a and 30b can each define a plurality of apertures spaced apart along the lengths of the first and second support arms 30a and 30b in order to support the mass 70 at any one of a plurality of distinct distances from the first and second bushing assemblies 40a and 40b.

The mass 70 can be any suitable mass of any suitable size or shape in order to dampen a particular frequency or range of frequencies. For example, the mass 70 can be a generally cylindrical mass as illustrated. The mass is selected based on its ability to oscillate at a frequency that matches the frequency of vibration of the mass system, such as a vehicle. Configuring the mass 70 such that it oscillates in resonance with the mass system allows for absorption of an optimal amount of energy from the vehicle.

With continued reference to FIGS. 1 and 2, and additional reference to FIG. 3, the first bushing assembly 40a will now be further described. The first bushing assembly 40a is substantially similar to the second bushing assembly 40b. Therefore, the description of the first bushing assembly 40a also applies to the second bushing assembly 40b. Features in common between the first and second bushing assemblies 40a and 40b are designated in the figures with the same reference numerals, but with the features of the first bushing assembly 40a including the suffix "a" and the reference numerals of the second bushing assembly 40b including the suffix "b."

The first bushing assembly 40a is coupled to the first support arm 30a at a bracket 90a of the first support arm 30a. The bracket 90a extends from opposite sides of the first support arm 30a to generally define an eye or aperture of the first support arm 30a. The bracket 90a can be integral with the first support arm 30a or coupled thereto in any suitable manner, such as with a weld 92a. The bracket 90a is generally circular, and thus the eye or aperture defined thereby is also circular.

A support element 100a is coupled to, or integral with, the bracket 90a. In applications where the support element 100a is not integral with the bracket 90a, the support element 100a can be coupled to the bracket 90a in any suitable manner. For example, the support element 100a can be press fit into the bracket 90a. The support element 100a is generally circular and has a U-shape in cross-section as illustrated in FIG. 3. The U-shaped cross-section generally includes a first end 102a and a second end 104a. The support element 100a defines a receptacle 106a, which is generally between the first and second ends 102a and 104a.

The first bushing assembly 40a further includes an elastomeric element 110a. The elastomeric element 110a is seated within the receptacle 106a defined by the support element 100a and is secured within the receptacle 106a in any suitable manner, such as any suitable mechanical manner including a press-fit. The elastomeric element 110a is generally cylindrical and includes an outer surface 112a, an inner surface 114a that is opposite to the outer surface 112a, and two side surfaces 116a and 118a. The outer surface 112a and the side surfaces 116a and 118a are press-fit into the receptacle 106a, and the inner surface 114a slightly protrudes beyond the first and second ends 102a and 104a of the support element 100a.

The elastomeric element 110a can be any suitable elastomeric element operable to articulate in shear (or torsion). For example, the elastomeric element 110a can be made of SAE J200 rubber. The elastomeric element 110a can be selected based on the vibrations to be absorbed or dampened. For example, the elastomeric element 110a can be selected to provide a particular bushing rate and elastomer internal damping rate suitable to allow the mass 70 to articulate in resonance with the mass system. The bushing rate is generally a torsion rate of the elastomeric element 110a based on stiffness of the elastomeric element 110a. The elastomer internal damping rate is the rate that energy is absorbed by the elastomeric element 110a. The elastomer internal damping rate can be set based on the type of rubber of the support element 100a.

The elastomeric element 110a is bonded to a mounting member of the first bushing assembly 40a, which can be a sleeve, such as an outer sleeve 120a. The outer sleeve 120a is generally cylindrical, and the inner surface 114a of the elastomeric element 110a is bonded to an outer surface 122a of the outer sleeve 120a in any suitable manner, such as with a suitable chemical bond. The outer sleeve 120a can be made of any suitable material, such as steel.

The outer sleeve 120a has an outer diameter that is substantially similar to, but slightly less than, an inner diameter of the support element 100a at the first and second ends 102a and 104a. Thus the first and second ends 102a and 104a of the support element 100a abut, or closely abut, the outer surface 122a of the outer sleeve 120a. The outer sleeve 120a includes an inner surface 124a, which generally defines a bore in which an inner sleeve 130a is seated. The outer sleeve 120a further includes a first end 126a and a second end 128a opposite thereto. The first end 126a extends beyond the first end 102a of the support element 100a. The second end 128a of the outer sleeve 120 extends beyond the second end 104a of the outer sleeve 120a.

The outer and inner sleeves 120a and 130a can be separate components as illustrated, or a single unitary component. When separate components, the outer and inner sleeves 120a and 130a can be coupled together in any suitable manner. For example, the outer sleeve 120a can be press fit onto the inner sleeve 130a.

The inner sleeve 130a can be made of any suitable material, such as steel. The inner sleeve 130a defines a bore 132a extending therethrough from a first end 134a to a second end 136a of the inner sleeve 130a. The bore 132a is configured to receive the first mounting bolt 50a in order to secure the first bushing assembly 40a to the first vehicle member 20a.

The first washer 60a is seated between a head of the first mounting bolt 50a and the first bushing assembly 40a. The first washer 60a can have any suitable diameter that is larger than the diameter of the outer sleeve 120a. The first washer 60a thus provides a retention feature that prevents the first support arm 30a from separating from the first vehicle member 20a. For example, in the unlikely event that the elastomeric element 110a decouples from the outer surface 122a of the outer sleeve 120a, the support arm 30a and both the bracket 90a and the support element 100a will be prevented from sliding off of the outer sleeve 120a by the first washer 60a.

With additional reference to FIG. 5, the vibration absorber 10 can be configured or tuned to absorb (or dampen) vibrations of any suitable frequency or frequency range. For example and further to the discussion above, the mass 70 can be arranged at any suitable location along the lengths of the first and second support arms 30a and 30b in order to move the mass 70 closer to or further away from the pivot axis A of the vibration absorber 10, which extends through the axial center of the first and second bushing assemblies 40a and 40b. In the exemplary illustration of FIG. 5, the mass 70 can be moved to any position along the length X of the first slot 76a defined within the first support arm 30a, as well as to any position along the length of the second slot 76b of the second support arm 30b. Furthermore, the first and second support arms 30a and 30b can be provided with any suitable length in order to vary the distance that the mass 70 is supported from the axis A.

Figure 7:
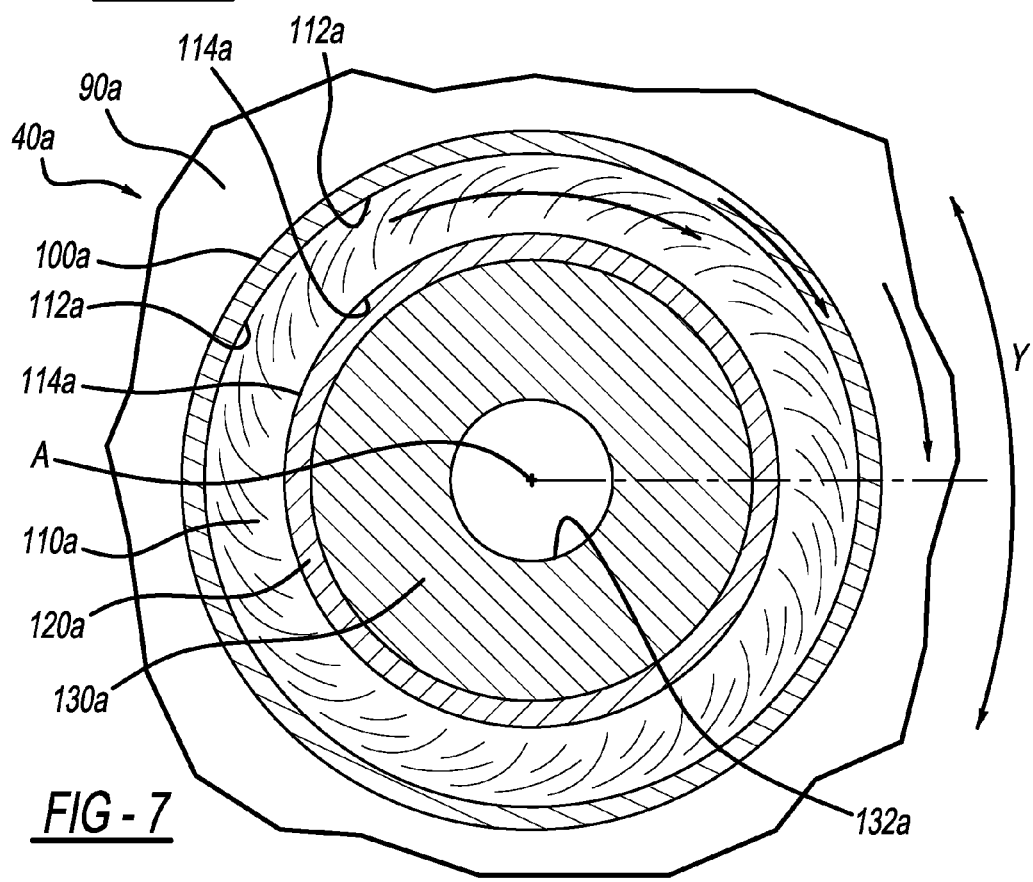
FIG. 7 illustrates exemplary articulation of an elastomeric element of the vibration absorber of FIG. 1 in shear.
Figure 6:
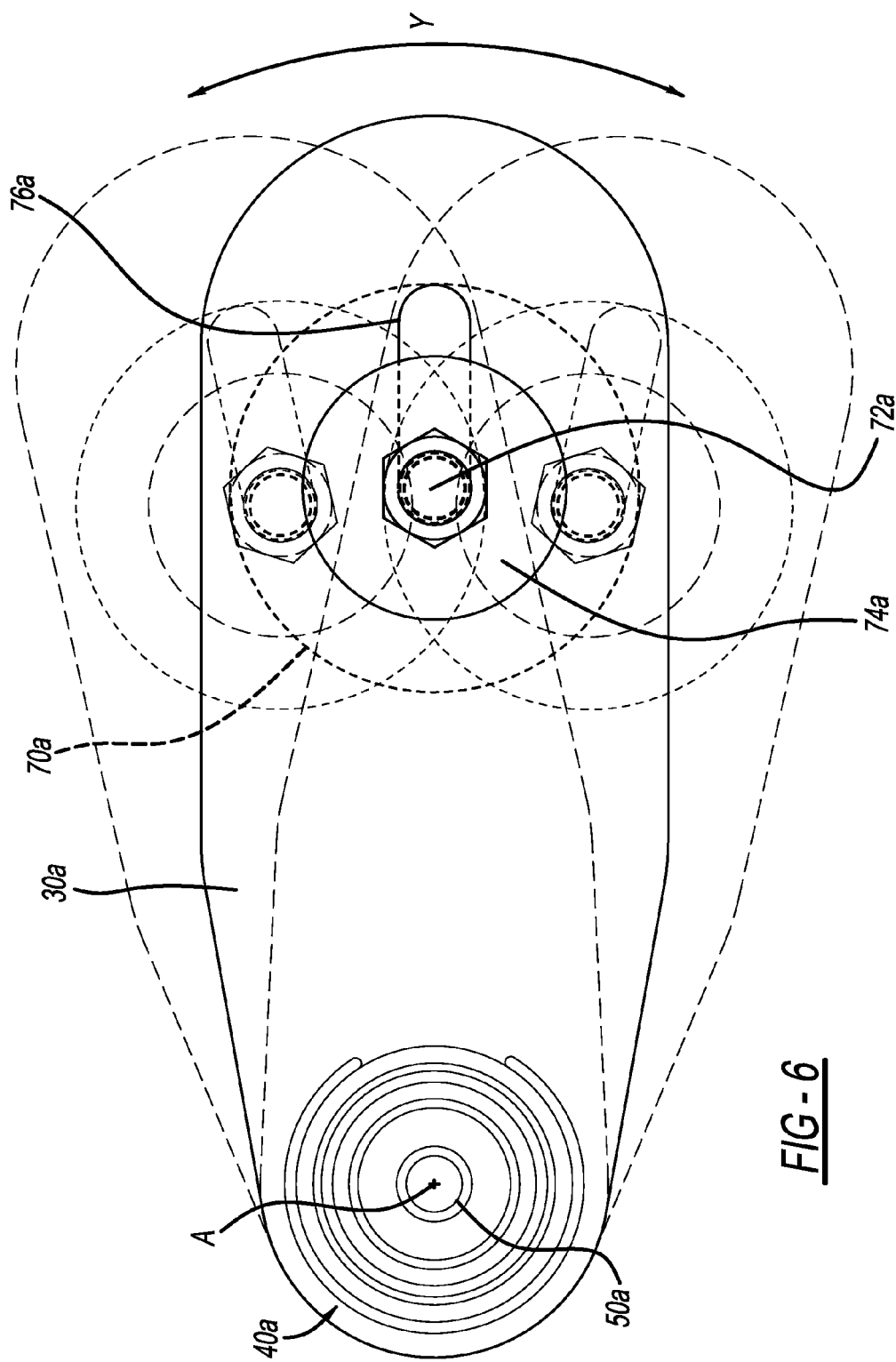
FIG. 6 is a side view of the vibration absorber of FIG. 1 illustrating exemplary movement of the vibration absorber when in resonance.

With additional reference to FIGS. 6 and 7, in response to vibrations of the vehicle or other high-mass systems that the vibration absorber 10 is coupled to, the vibration absorber 10 will oscillate about the axis A within any suitable range, such as range Y of FIG. 6. In order to maximize the ability of the vibration absorber 10 to absorb or dampen vibrations of the mass-system, the vibration absorber 10 is tuned to oscillate in resonance with the mass system. The vibration absorber 10 can be tuned to oscillate in resonance in any suitable manner, such as explained above for example.

With reference to FIG. 7, as the vibration absorber 10 oscillates about axis A the elastomeric element 110a is articulated in shear (or torsion). Therefore, as the vibration absorber 10 oscillates downward or clockwise with respect to axis of rotation A, the elastomeric element 110a will articulate in shear in a clockwise direction. Specifically, the portion of the elastomeric element 110a proximate to the outer surface 112a thereof will be stretched in a clockwise direction while the portion of the elastomeric element 110a at the inner surface 114a thereof will remain stationary. Conversely, as the vibration absorber 10 oscillates in the counter-clockwise direction along axis of rotation A, the elastomeric element 110a will be stretched in the counter-clockwise direction such that the portion of the elastomeric element 110a at the outer surface 112a is stretched counter-clockwise while the portion at the inner surface 114a remains stationary. Thus during oscillation of the vibration absorber 10, the bracket 90a and the support element 100a rotate clockwise or counter-clockwise along axis of rotation A, while the outer and inner sleeves 120a and 130a remain stationary.

The elastomeric element 110a is selected to have a relatively low shear or torsion rate, which allows the vibration absorber 10 to reach a low target frequency often seen in vehicle suspension systems. The elastomeric element 110a is provided with a higher compression rate in directions other than shear (rotation about axis A), which should restrict movement of the first and second bushing assemblies 40a and 40b in directions other than shear, such as in a direction parallel to the axis A.

The present teachings thus provide for numerous advantages. For example, because the elastomeric elements 110a and 110b are articulated in shear, they are able to oscillate in resonance with the mass system at low frequencies. The range of motion Y of the vibration absorber 10 about the axis of rotation A is great, which provides for effective energy absorption. Because the vibration absorber 10 is long enough to span between first and second frame members or rails 20a and 20b of a vehicle, the vibration absorber 10 is able to make efficient use of available vehicle space and maximize size of the mass 70. The first and second washers 60a and 60b provide fail-safe construction, which minimizes any possibility of the mass 70 becoming detached from the mass system.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A vibration absorber for a vehicle, the vibration absorber comprising:
   a first bushing assembly including a first elastomeric element;
   a second bushing assembly having a second elastomeric element;
   a cylindrical mass attached to both the first bushing assembly and the second bushing assembly; wherein
   movement of the cylindrical mass simultaneously articulates both the first elastomeric element and the second elastomeric element in shear;
   the cylindrical mass includes only a cylindrical body attached to the first and second bushing assemblies;
   the first bushing assembly is mounted to a first support arm and the second bushing assembly is mounted to a second support arm;
   a first end of the cylindrical mass is coupled directly to the first support arm and a second end of the cylindrical mass is coupled directly to the second support arm;
   the cylindrical mass extends between the first support arm and the second support arm; and
   the first and the second support arms are configured to couple with the cylindrical mass at a plurality of different locations along respective lengths of the first and second support arms to tune the vibration absorber to absorb a predetermined frequency.

2. The vibration absorber of claim 1, wherein the first and second bushing assemblies each include a sleeve and a support element defining a receptacle, the elastomeric element is bonded to the sleeve and seated within the receptacle.

3. The vibration absorber of claim 2, wherein:
   the sleeve is an outer sleeve press-fit onto an inner sleeve; and
   the inner sleeve defines a bore configured to receive a fastener for fastening the bushing to a vehicle frame.

4. The vibration absorber of claim 1, wherein each of the first and second support arms defines a slot which provides the plurality of different locations.

5. The vibration absorber of claim 1, wherein the first support arm extends directly from the first bushing assembly to the cylindrical mass and the second support arm extends directly from the second bushing assembly to the cylindrical mass.

6. The vibration absorber of claim 5, wherein each of the first and second support arms defines a slot which provides the plurality of different locations.

7. A vibration absorber for a vehicle comprising:
   a first support arm defining a first aperture;
   a second support arm defining a second aperture;
   a cylindrical mass mounted to the first and second support arms;
   a first and second mounting member seated within the aperture of the first and second support arms respectively, and configured to be mounted to the vehicle; and
   a first elastomeric element between the first mounting member and the first support arm;
   a second elastomeric element between the second mounting member and the second support arm;
   wherein movement of the cylindrical mass articulates the first and second elastomeric elements in shear to absorb vibration of the vehicle;
   the cylindrical mass includes only a cylindrical body attached directly to the first and second support arms; and
   the first and the second support arms are configured to couple with the cylindrical mass at a plurality of different locations along respective lengths of the first and second support arms to tune the vibration absorber to absorb a predetermined frequency.

8. The vibration absorber of claim 7, wherein the elastomeric element extends completely around the mounting member, and the mounting member includes a sleeve defining a bore configured to receive a fastener for mounting the mounting member to the vehicle.

9. The vibration absorber of claim 7, wherein the elastomeric element is mechanically press-fit within a receptacle defined by a support element, the support element is coupled to the support arm, and the support element is configured to rotate about the mounting member upon movement of the support arm by the cylindrical mass.

10. The vibration absorber of claim 7, wherein each of the first and second support arms defines a slot which provides the plurality of different locations.

11. The vibration absorber of claim 7, wherein the first support arm extends directly from the first mounting member to the cylindrical mass and the second support arm extends directly from the second mounting member to the cylindrical mass.

12. The vibration absorber of claim 11, wherein each of the first and second support arms defines a slot which provides the plurality of different locations.

13. A vibration absorber for a vehicle comprising:
- a first support arm including a first bushing assembly configured to be mounted to the vehicle;
- a second support arm including a second bushing assembly configured to be mounted to the vehicle, the first and the second support arms extend generally parallel to one another;
- a cylindrical mass mounted to and extending between the first and the second support arms; and
- an elastomeric element included with each one of the first and the second bushing assemblies, movement of the cylindrical mass articulates the elastomeric element of each of the first and the second bushing assemblies in shear to absorb vibration of the vehicle; wherein
- the cylindrical mass includes only a cylindrical body attached directly to the first and second support arms; and
- the first and the second support arms are configured to support the cylindrical mass at a plurality of different distances from the first and the second bushing assemblies to tune the mass.

14. The vibration absorber of claim 13, wherein the first and the second support arms are configured to be mounted to parallel frame rails of the vehicle.

15. The vibration absorber of claim 13, wherein each of the first and second support arms defines a slot which provides the plurality of different locations.

16. The vibration absorber of claim 13, wherein the first support arm extends directly from the first bushing assembly to the cylindrical mass and the second support arm extends directly from the second bushing assembly to the cylindrical mass.

17. The vibration absorber of claim 16, wherein each of the first and second support arms defines a slot which provides the plurality of different locations.

* * * * *